(12) United States Patent
Thammasouk et al.

(10) Patent No.: US 11,491,812 B1
(45) Date of Patent: Nov. 8, 2022

(54) GARMENT PERSONALIZATION WITH AUTONOMOUS ROBOTS

(71) Applicant: CreateMe Technologies LLC, New York, NY (US)

(72) Inventors: Khamvong Thammasouk, San Jose, CA (US); Thomas C. K. Myers, New York, NY (US); Jinhwa Jung, San Jose, CA (US); Benjamin R. Waller, IV, Oakland, CA (US); David B. Lemke, Nine Mile Falls, WA (US)

(73) Assignee: CreateMe Technologies LLC, New York, NY (US)

( * ) Notice: Subject to any disclaimer, the term of this patent is extended or adjusted under 35 U.S.C. 154(b) by 0 days.

(21) Appl. No.: 17/676,567

(22) Filed: Feb. 21, 2022

Related U.S. Application Data

(62) Division of application No. 17/364,694, filed on Jun. 30, 2021, now Pat. No. 11,254,154.

(51) Int. Cl.
*B41J 29/38* (2006.01)
*B65G 1/137* (2006.01)

(52) U.S. Cl.
CPC .......... *B41J 29/38* (2013.01); *B65G 1/1375* (2013.01)

(58) Field of Classification Search
CPC ........ B65G 1/137; B65G 47/88; B41J 3/4078; H01L 21/67109
See application file for complete search history.

(56) References Cited

U.S. PATENT DOCUMENTS

| | | | |
|---|---|---|---|
| 6,464,789 B1 * | 10/2002 | Akimoto | H01L 21/67109 118/712 |
| 6,882,126 B2 | 4/2005 | Watson et al. | |
| 8,292,395 B2 | 10/2012 | Ben-Zur et al. | |
| 9,363,899 B2 | 6/2016 | Zwiers et al. | |
| 9,764,549 B2 | 9/2017 | Kimoto | |
| 2011/0157288 A1 | 6/2011 | Morimoto et al. | |
| 2014/0210882 A1 | 7/2014 | MacKenzie et al. | |
| 2014/0374375 A1 | 12/2014 | Zwiers et al. | |

FOREIGN PATENT DOCUMENTS

WO 2020025130 A1 2/2020

OTHER PUBLICATIONS

U.S. Appl. No. 17/232,089, "Personalization Vending Kiosk," filed Apr. 15, 2021.

* cited by examiner

*Primary Examiner* — Lam S Nguyen
(74) *Attorney, Agent, or Firm* — Patterson + Sheridan, LLP

(57) ABSTRACT

Embodiments herein describe a DTG printing environment that uses autonomous robots to move garments between DTG processing stages (e.g., retrieval stages, pretreatment stages, printing stages, drying stages, etc.). Doing so removes the dependency of DTG printing process on the stage that consumes the most time. In one embodiment, the DTG processing stages or the autonomous robot include an actuator for moving the garment and the DTG processing stage closer together. In one embodiment, the processing stage includes a lift (e.g., an actuator) that lifts a detachable carrier from the robot on which the garment is mounted. The lift can level and rotate the detachable carrier to provide a fine alignment between the garment and the DTG processing stage. While a lift is specifically disclosed, in other embodiments, the actuator could be disposed on the robot to lift up the garment.

16 Claims, 15 Drawing Sheets

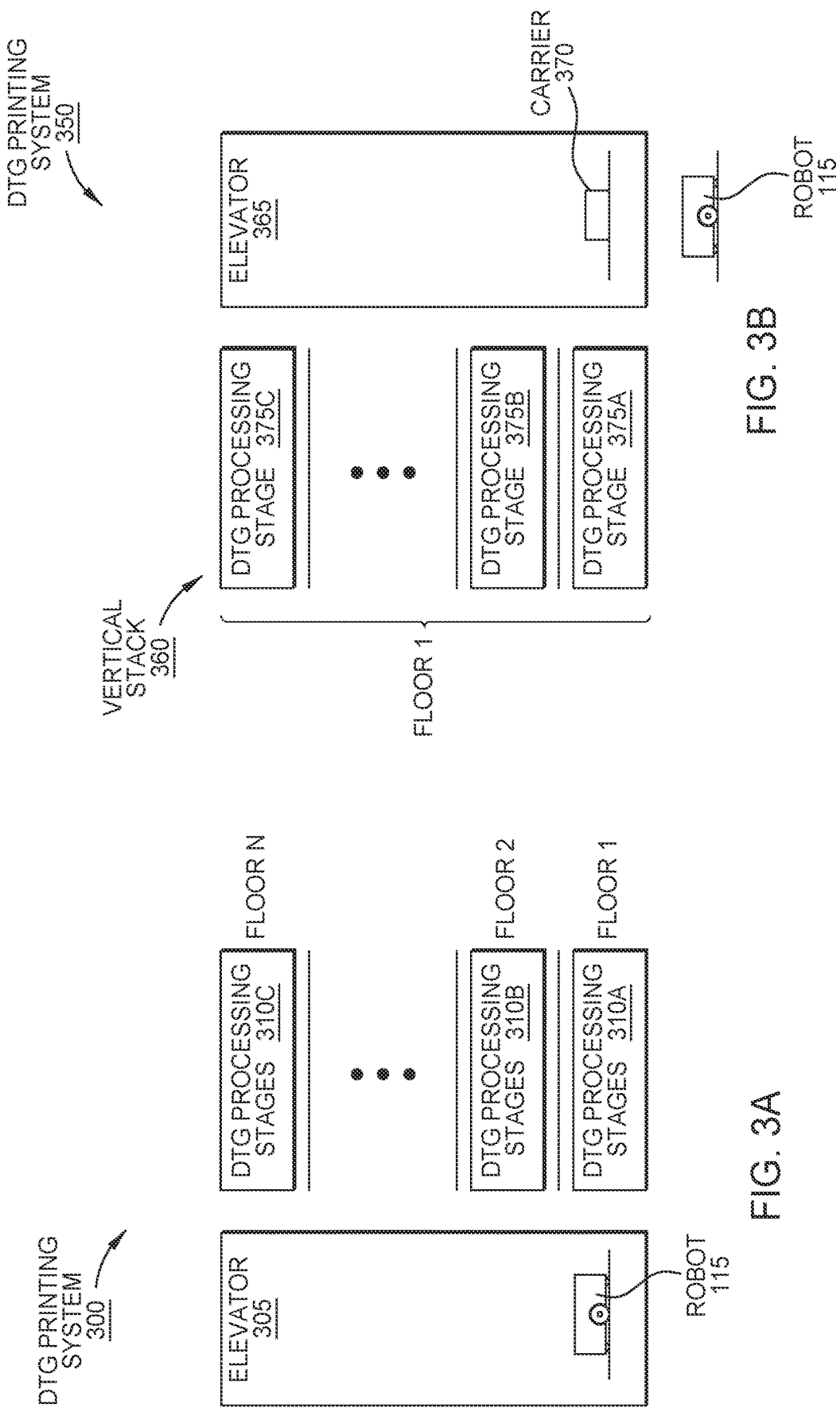

GARMENT PERSONALIZATION WITH AUTONOMOUS ROBOTS

CROSS-REFERENCE TO RELATED APPLICATIONS

This application is a divisional of co-pending U.S. patent application Ser. No. 17/364,694, filed Jun. 30, 2021 entitled "GARMENT PERSONALIZATION WITH AUTONOMOUS ROBOTS", which is herein incorporated by reference in its entirety.

TECHNICAL FIELD

Embodiments presented in this disclosure generally relate to a system for garment personalization using autonomous robots.

BACKGROUND

Personalization of garments and accessories is becoming more popular through embroidery and various methods of printing art on the garment, including screen printing, dye sublimation and Direct To Garment (DTG) printing. Personalization of garments is currently a labor-intensive process that requires large areas for the machines to be placed so that skilled operators can work around the machines in order to handle the garments and operate the machines mostly in a piecemeal fashion. Large scale DTG printing operations can include multiple processing stages, such as loading, pretreatment, drying, and quality control. However, most large-scale operations are serialized to form several pipelines. For example, each pipeline may include a loading stage, pretreatment stage, printing stage, drying stage, and packaging stage. The problem with serializing DTG printing is that the throughput is limited by the processing stage that requires the most time. For example, most of the processing stages may require only a few minutes to complete, but one may require over ten minutes. Because of this, the garments in the pipeline can progress through each processing stage only as fast as the most time consuming stage.

SUMMARY

One embodiments described herein is a system that includes a digital printing processing stage and an actuator configured to change a relative vertical distance between the digital printing processing stage and an article where the article is mounted on carrier configured to be transported by an autonomous robot.

Another embodiment described herein is a system that includes an autonomous robot with a drive system configured to move the autonomous robot in an environment and first supporting features disposed on a top side of the autonomous robot. The system also includes a detachable carrier configured to hold an article for digital printing where the detachable carrier includes second supporting features configured to mate with the first supporting features to mechanically interface the detachable carrier with the autonomous robot.

Another embodiment described herein is a digital printing environment that includes a plurality of pretreatment stations, a plurality of digital printing stations, and a plurality of autonomous robots configured to transport articles between the plurality of pretreatment stations and the plurality of digital printing stations. Moreover, at least a first pretreatment station of the plurality of pretreatment stations is disposed on a first x-y plane and at least a first digital printing station of the plurality of digital printing stations is disposed on a second x-y plane parallel to the first x-y plane so that the first pretreatment station and the first digital printing station are vertically separated in a z direction.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

FIGS. 3A and 3B illustrate disposing DTG processing stages above one another, according to embodiments.

DETAILED DESCRIPTION

Figure 1:
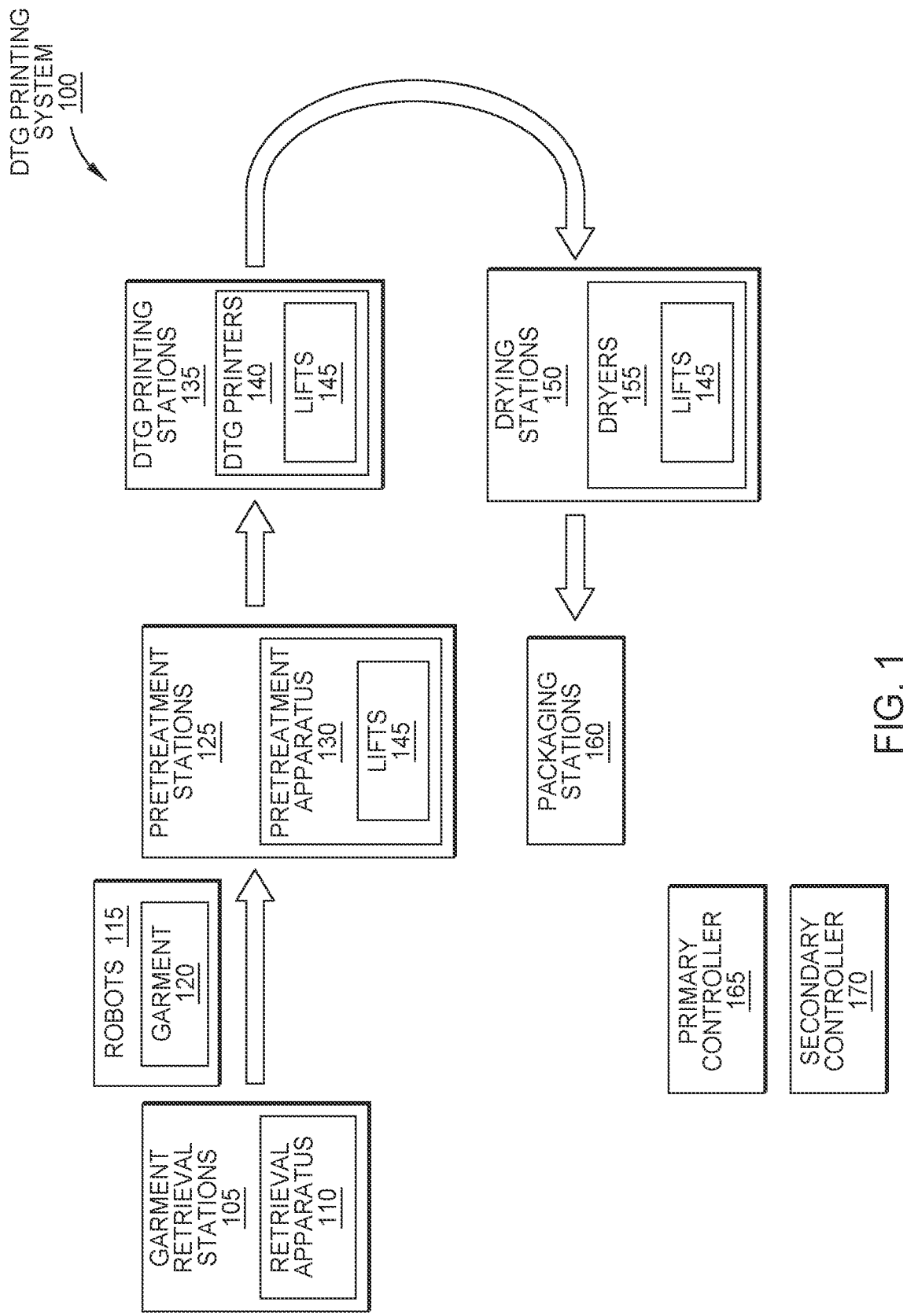
FIG. 1 is a block diagram of a DTG printing environment, according to one embodiment.

Embodiments herein describe a digital printing environment that uses automation and parallel operation to process garments between and at each digital printing processing stages (e.g., retrieval stages, pretreatment stages, printing stages, drying stages, etc.). Doing so removes the dependency of digital printing process on the stage that consumes the most time. Rather than a garment proceeding in serial manner down a fixed pipeline, in the embodiments herein, an autonomous robot can move the garment to any available stage. Unlike in a serialized digital printing process where there are typically equal number of processing stages, the digital printing environment can a greater number of the stages that require the most time while having fewer numbers of the stages that take less time. This may reduce the overall cost of the system, reduce the footprint of the digital printing environment, and improve the throughput (i.e., reduce the time needed for a garment to complete the digital printing process). The embodiments herein specifically discuss DTG printing as one example, but can be applied to any digital printing processes such as screen printing, or other embellishing.

In one embodiment, the DTG processing stages or the autonomous robot include an actuator (e.g., elevator) for moving the garment and the DTG processing stage closer together. For example, when the autonomous robot moves a garment to a DTG processing stage, it may be difficult to ensure the garment and the stage are properly aligned solely on the movement of the robot (e.g., where millimeter alignment accuracy is desired). The movement of the robot can provide a rough alignment while the actuator provides a fine alignment between the garment and the processing stage. In one embodiment, the processing stage includes a lift (e.g., an actuator) that lifts a detachable carrier from the robot on which the garment is mounted. The lift can level and rotate the detachable carrier to provide a fine alignment between the garment and the DTG processing stage. Also, separating the garment from the robot may reduce the likelihood any caustic or damaging chemicals used during the DTG processing stage are deposited on the robot. While a lift is specifically disclosed, in other embodiments, the actuator could be disposed on the robot to lift up the garment. Alternatively, instead of moving the garment, an actuator could move the DTG processing stage (e.g., move a DTG printer) in a direction towards the garment to provide a fine alignment while the robot remains stationary.

While the discussion below describes performing DTG printing on a garment (e.g., a piece of clothing), the embodiments herein can be performed using various "articles" which can include, but are not limited to, a piece of clothing (e.g. shirts, pants, socks, shoes, shorts, coats, jackets, skirts, dresses, underwear, hats, headbands, etc.), accessories (e.g. wallet, purse, etc.), and homewares (e.g. towels, pillow cases, blankets, mats, etc.).

FIG. 1 is a block diagram of a DTG printing system 100, according to one embodiment. Unlike a serialized DTG printing process which may rely on a track or a conveyor belt to iteratively move a garment through different DTG processing stages, the DTG printing system 100 relies on autonomous robots 115 to move garments 120 between at least two different stations. As used herein, "autonomous robots" include any robot that can navigate an environment without human guidance or intervention. An autonomous robot can be fully autonomous (i.e., operate without receiving navigation commands from any external entity, whether human or a software application) or partially autonomous where the robot receives navigational commands (e.g., step-by-step directions or routes) from an external non-human controller (e.g., a control tower). However, in some embodiments tracks or conveyor belts can also be used to move the garments 120 between some stations, or between different locations in the same station, to result in a hybrid approach where the robots 115 are used to move the garments 120 between some stations, while other means are used to move the garments 120 between other stations.

The DTG printing system 100 includes a primary controller 165 and a secondary controller 170 for controlling the movement of the robots 115 through the environment. These controllers 165, 170 may be software applications stored in memory and executed using one or more processors in a computing system. In one embodiment, the primary controller 165 monitors the various stations in the system 100 to determine which ones are currently occupied and which ones are available (or are about to become available). With this information, the primary controller 165 can decide which station to process which job and in what sequence. In one embodiment, the primary controller 165 commands the secondary controller to supply a particular garment to a particular station.

The secondary controller 170 can manage traffic in the DTG printing system 100 by managing the routes the robots 115 take when moving between stations. The secondary controller 170 receives the commands from the primary controller 165 and determines routes for the robots 115 so the commands are fulfilled. For example, the robots 115 may follow markers disposed on the floor of the environment (e.g., a warehouse) such as a grid of intersecting lines. The secondary controller 170 can provide instructions to the robots 115 for navigating the grid to move from its current location to the location of the next station that was selected by the primary controller 165. The secondary controller 170 can monitor the location of all the robots 115 in the environment and ensure their paths do not cause a collision. For example, if the routes for two robots 115 intersect, the secondary controller 170 may instruct one robot 115 to pause to permit the other robot to pass before permitting the robot to continue along its path. In this embodiment, the primary controller 165 selects the destinations (e.g., stations) for the robots 115 while the secondary controller 170 controls the lower-level route planning and navigation in order to move the robot 115 to those destinations. However, this is just one example. In yet another example, the robots 115 may be permitted to select their own routes between destinations selected by the primary controller 165. In that example, the robots 115 may have navigation sensors to determine its location in the environment and proximity sensors in order to detect and prevent collisions with other robots 115. In one embodiment, the environment can include intersection signals to provide guidance to the robots 115 to find their way from one station to the next. For example, red, green, and yellow lights can be used to communicate left, right, and straight commands. In another embodiment, the environment can include small displays used to display at an intersection a specific QR code that provides the necessary instruction for the robot that reads the QR code at the intersection.

The system 100 includes garment retrieval stations 105 that each include a retrieval apparatus 110 that can mount the garment 120 onto a respective robot 115. The retrieval apparatus 110 can be any machine that can pick up a garment and mount it or place it on the robot 115. One example of a retrieval apparatus 110 is discussed in FIGS. 8A-8D below. Further, in another embodiment, instead of using a retrieval apparatus 110, a human could pick and place the garments 120 on the robots 115.

While the embodiments below discuss mounting a single garment 120 onto each robot 115, in other embodiments multiple garments could be mounted on the same robot 115 which could be processed in parallel or iteratively at the different stations.

After retrieving a garment 120, the robots 115 proceed to one of the pretreatment stations 125. These stations 125 include a pretreatment apparatus 130 for applying a pretreatment solution to the garment 120. The pretreatment apparatus 130 can apply the pretreatment solution to an entire side of the garment or only to a portion to be printed on (e.g., if the printed image covers only a small portion of a T-shirt rather than the entire side of the T-shirt). The embodiments herein are not limited to any particular type of pretreatment apparatus 130, but one example of a pretreatment apparatus 130 is discussed in FIGS. 9A-9D below.

Once the pretreatment solution is applied, the robots 115 move the garments 120 to one of the DTG printing stations 135 where an image is printed on the garments 120. In this example, the system 100 uses a wet-on-wet DTG printing process where an image is printed onto the pretreated area of the garment 120, which still might be wet. However, the embodiments herein can also be used in a wet-on-dry DTG printing process where the pretreatment solution is first dried (e.g., using drying stations) before the image is printed onto the garment 120. In other embodiments, depending on the composition of the fabric, the complexity of the art work or requirements of the job, other methods for printing on garments may be used such as screen printing or dye sublimation. In some embodiments, the system 100 may include one or more printing station, each using a different garment printing method. In one embodiment, after the initial DTG printing is complete, the article/robot may be rerouted for a second embellishing step such as embroidery, etc., or vice versa where embroidery is first performed before DTG printing.

The DTG printing stations 135 include DTG printers 140 that use printheads (e.g., dot matrix printheads) to print images on the garments 120, and more specifically, onto the area, or areas, of the garments 120 that have been pretreated. The embodiments herein are not limited to any particular type of DTG printer 140. In one embodiment, the DTG printer 140 has a printhead that moves in one or more axes (e.g., X and Y directions in a plane parallel to the ground). That is, the garment 120 may be held in a fixed position while the printhead moves in the X and Y directions to print the image. Keeping the garment 120 fix while moving the printhead has the advantage of using a simple lift for raising and leveling the garment relative to the printhead rather than a system that requires precise control of the carrier so that the carrier can be moved laterally when performing printing. However, in other embodiments, the garment 120 may be moved while the printhead is held in a fixed position.

The DTG printers 140 can include respective lifts 145 for aligning the garments 140 carried by the robots 115 with the printhead of the DTG printers 140. In one embodiment, the lifts 145 remove a detachable carrier from the robots 115 on which the garment is mounted and aligns the detachable carrier with the printhead. Alternatively, the lift 145 may raise and align the entire robot with the printhead. In yet another embodiment, the lift 145 may lower or raise the DTG printer 140 so it is aligned with the garment 120 on the robot 115, while the robot 115 remains in a fixed location. One example implementation of the lift 145 is discussed in FIGS. 6A-6F.

In addition to using lifts 145 to align the garments 120 with the DTG printers 140, lifts 145 are also used at the other stations as well. For example, it may be advantageous to lift the garments 120 away from the robots 115 when applying the pretreatment solution at the pretreatment stations 125 so that these chemicals do not spray onto the robot 115 (which may cause corrosion), or to lift the garments 120 at the drying stations 150. Thus, the same or different types of lifts may be used at other stations in the system 100 in order to change the spatial relationship between the apparatuses at those stations and the garments 120. In some embodiments, each operating station such as the pretreatment station or the DTG printing station may be fully or partially sealed from its surroundings. In some embodiments, each operating station may be vented to the outside so as to carry any fumes, odors or volatile chemicals to an exhaust processing system. In some embodiments, lifting the carrier to its resting position under an operating station provides the sealing function that isolates the operating station from the rest of the system during operation.

Once the image is printed, the robots 115 move the garments 120 to drying stations 150 which houses dryers 155. The dryers 155 help cure the wet-on-wet DTG printing process by drying the pretreatment solution and the ink applied by the DTG printers 140. Of course, if a wet-on-dry process were used instead, the drying stations 150 would only be used to dry the ink since the pretreatment solution would have been dried at an earlier drying stage. In some embodiments, the drying stations may include one or more types of dryers including forced air or convection dryers, radiation dryers, and UV light dryers.

The robots 115 then move the garments 120 to packaging stations 160 where the garments 120 are removed from the robot 115, folded, and placed in containers (e.g., boxes or padded envelopes) to be shipped. The various operations performed at the packaging station 160 may be performed by machines, humans, or a combination of both.

The number of stations at each of the processing stages in the system 100 may vary. For example, for the processing stages that require more time, the system 100 may have more stations for those stages, but fewer stations for the processing stages that take less time. For example, if printing requires more time than pretreatment, the system 100 may have more printers 140 than pretreatment apparatuses 130. This may improve the overall throughput of the system 100 relative to a system where there are the same number of stations for each processing stage. In some embodiments, processing stages of the system 100 are modular and the number of each station may be added or subtracted, as the throughput requirements of system 100 changes.

While not shown in FIG. 1, the DTG printing system 100 can include any number of inspection stages. For example, a first inspection stage may be between the garment retrieval stations 105 and the pretreatment stations 125 to ensure the garments 120 were properly loaded onto the robot 115 and there are no wrinkles in the garments 120, which can result in a low quality DTG image or clogging of the printing nozzles. A second inspection stage may be between the DTG printing stations 135 and the drying stations 150 to ensure the DTG image appears correct (e.g., good color, sharp lines, correct image for the right t-shirt, etc.). A third inspection stage may be between the drying stations 150 and the packaging stations 160 to ensure the drying process did not cause any smearing of the image. These inspection stages can use computer vision systems (e.g., automated optical inspection (AOI)) that include cameras attached to a computer vision application that relies on artificial intelligence to detect wrinkles, image defects, etc. Or the inspection stages can rely on human inspectors, or a combination of both.

Figure 2:
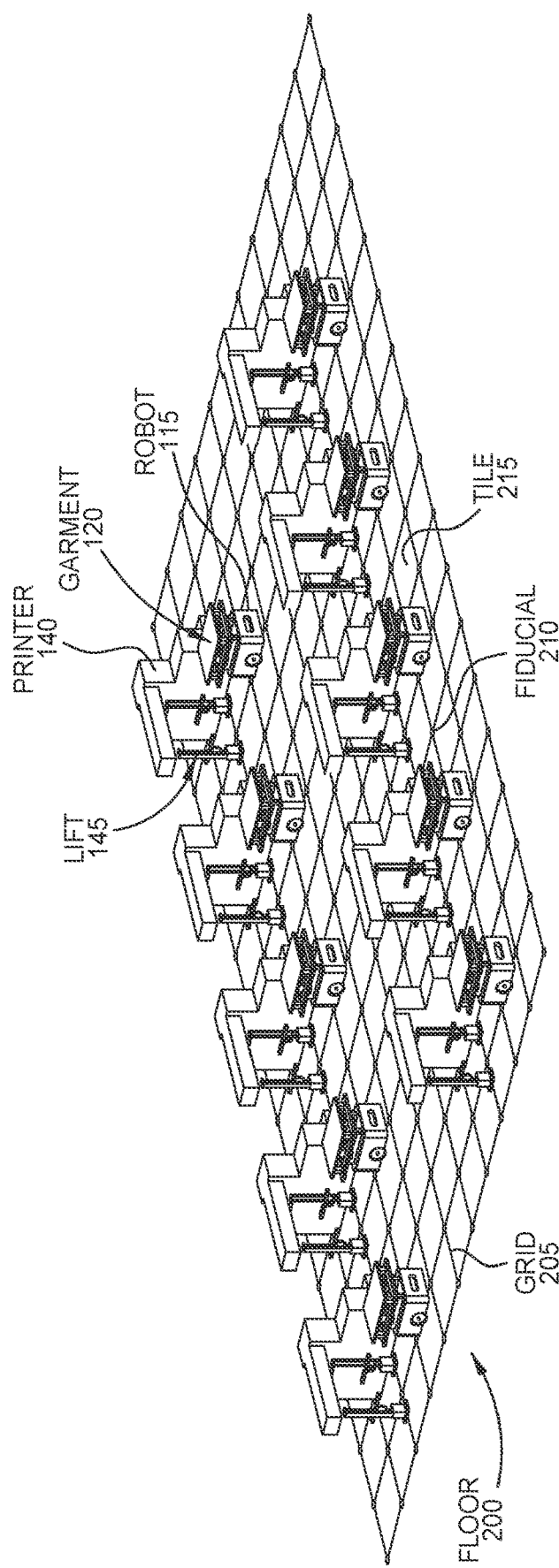
FIG. 2 illustrates autonomous robots delivering garments to DTG printers, according to one embodiment.

FIG. 2 illustrates autonomous robots 115 delivering garments to DTG printers 140, according to one embodiment. As shown, a floor 200 of the environment containing the printers 140 has a grid 205 formed by intersecting vertical and horizontal lines defining tiles 215. The grid 205 can be paint or tape applied to the floor. In one embodiment, the grid is formed by grooves in between tiles forming the floor. Moreover, a fiducial 210 (e.g., a QR code) is disposed at each intersection of the vertical and horizontal grid lines. The robots 115 have cameras with field of views that include the floor 200 to detect the grid 205 and the fiducials 210. The robots 115 can use the grid 205 to navigate the floor 200 of the warehouse in order to travel between the different stations (not shown) and the printers 140.

The fiducials 210 provide location information to the robots 115 which they can report to a controller (e.g., the primary or secondary controllers discussed in FIG. 1). That is, each fiducial 210 may be assigned a different or unique code so the fiducial 210 has a unique location in the warehouse. When the robot 115 detects a fiducial and reports its code to the controller, the controller then knows the location of the robot 115 on the floor 200. The controller can then give an instruction to the robot 115 in order to navigate to its destination (e.g., go straight, turn left at the intersection, or turn right at the intersection). As the robot 115 encounters a new fiducial 210, the controller can provide an updated instruction to the robot 115 until it reaches its destination (e.g., a printer 140 or some other station on the floor 200). In some embodiments, other types of fiducials may be used. For example, signal lights of different colors may be used to communicate the next navigation instruction. In some embodiments, sensors including magnetic or optical sensors at intersections may be used to detect the robot's location and accordingly provide the next navigation instruction.

However, using the grid 205 and fiducials 210 to enable the robots 115 to traverse the floor 200 is just one suitable example. In another embodiment, the robots 115 may have location sensors such as range finders, depth sensors, GPS receivers, and the like that enable them to identify their location and move about the floor 200 without the aid of any markers or fiducials on the floor 200. Further, the robots 115 may not receive step-by-step instructions from a controller, but rather receive destination information from the controller and then use an internally saved map of the warehouse and its known location to safely navigate to the destination.

In this example, the robots 115 drive the garments 120 underneath a portion of the printer 140. The lift 145 then raises the garment 120 up to align it with a printhead (e.g., within a centimeter, or within a few millimeters, of the printhead) that is disposed on an underside of the printer 140. As mentioned above, the lift 145 can raise a detachable carrier holding the garment (as is the case in FIGS. 6A-6F) or could raise the entire robot 115. Alternatively, instead of raising the garment 120, the lift 145 may be integrated into the printer 140 in order to lower the printhead until it is a desired distance from the garment 120. However, the garment 120 may not be level with the ground when deposited on the robot (due to uneven floor or manufacturing tolerances of the robot). The processing stage may include a leveling apparatus on which the robot sits when positioning underneath the printhead. The leveling apparatus can tilt the robot which in turn can level the garment with the printhead before printing, thereby compensating for unevenness in the floor or manufacturing tolerances of the robot.

FIGS. 3A and 3B illustrate disposing DTG processing stages above one another, according to embodiments. FIG. 3A illustrates a DTG printing system 300 where multiple DTG processing stages 310 are located on different floors of a warehouse. As shown, the DTG processing stages 310A are located on Floor 1, the DTG processing stages 310B are located on Floor 2, and the DTG processing stages 310C are located on Floor N. In one embodiment, the types of DTG processing stages 310 on a particular floor may all be the same. For example, the DTG processing stages 310A may be pretreatment apparatuses, while the DTG processing stages 310B are DTG printers and the DTG processing stages 310C are dryers. Alternatively, the floors may have multiple types of DTG processing stages. For example, the DTG processing stages 310 may include garment retrieval apparatuses while the DTG processing stages 310B include pretreatment apparatuses, DTG printers, and dryers, and the DTG processing stages 310C include folding and packaging apparatuses.

The system 300 includes an elevator 305 for moving the robots 115 between the various floors. By separating the DTG processing stages onto different floors, the overall footprint of the warehouse containing the system 300 can be reduced.

Like FIG. 3A, FIG. 3B illustrates disposing some of the DTG processing stages above one another. However, FIG. 3B illustrates a DTG printing system 350 where the DTG processing stages 375 are arranged in a vertical stack 360 on the same floor, rather than different floors. For example, the DTG processing stage 375A may be a pretreatment apparatus while the DTG processing stage 375B is a DTG printer and the DTG processing stage 375C is a dryer. Any kind of support structure can be used to form the vertical stack 360 of the processing stages 375.

An elevator 365 can move the garment between the processing stages 375. However, instead of moving the entire robot 115 like in FIG. 3A, in FIG. 3A the elevator 365 moves just a carrier 370 holding the garment. That is, the elevator 365 may have a machine that removes the carrier 370 from the robot 115 and moves the carrier 370 between the different DTG processing stages 375. Thus, the term elevator can include an apparatus that lifts only the platen as well as an apparatus that lifts both the platen and the robot together. The processing stages 375 may have conveyor belts or tracks for removing the carrier 370 from the elevator 365. Once the garment is processed, the processing stages 375 move the carrier 370 back into the elevator so the garment can be moved to the next processing stage 375 in the vertical stack 360. Once the garments is processed through all the stages 375, the elevator can move the carrier 370 back onto the robot 115 using a lifting apparatus. Alternatively, instead of using an elevator, the robot 115 may carry rack with multi-layer of platens that can then load to the DTG printers in the vertical stack.

In addition to the vertical stack 360, the DTG printing system 350 may include other processing stages that are not arranged in a vertical stack. For example, the garment retrieval stations and the packaging stations may not be in vertical stack with other DTG processing stages.

Figure 4A:
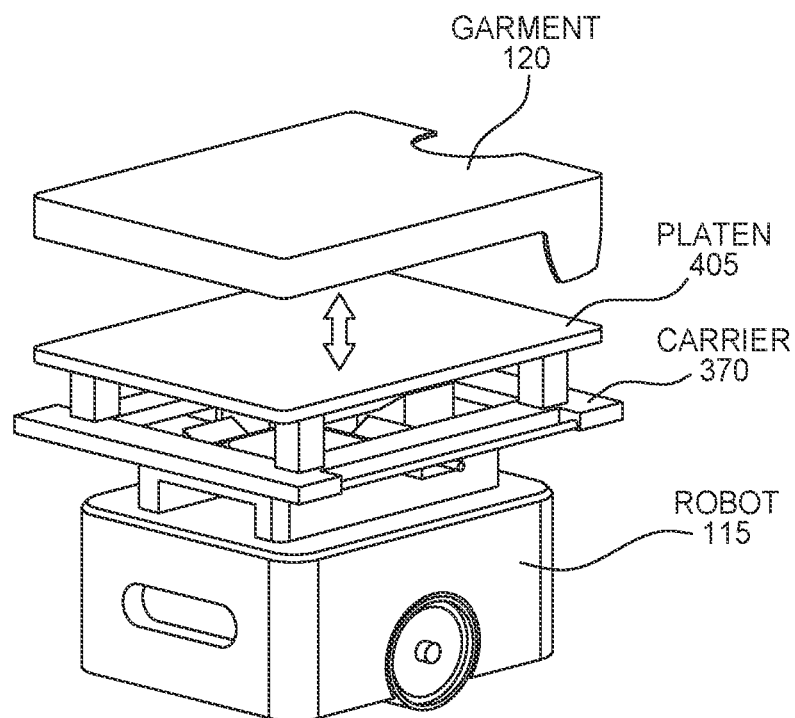
FIGS. 4A and 4B illustrate several views of an autonomous robot, according to embodiments.
Figure 4B:
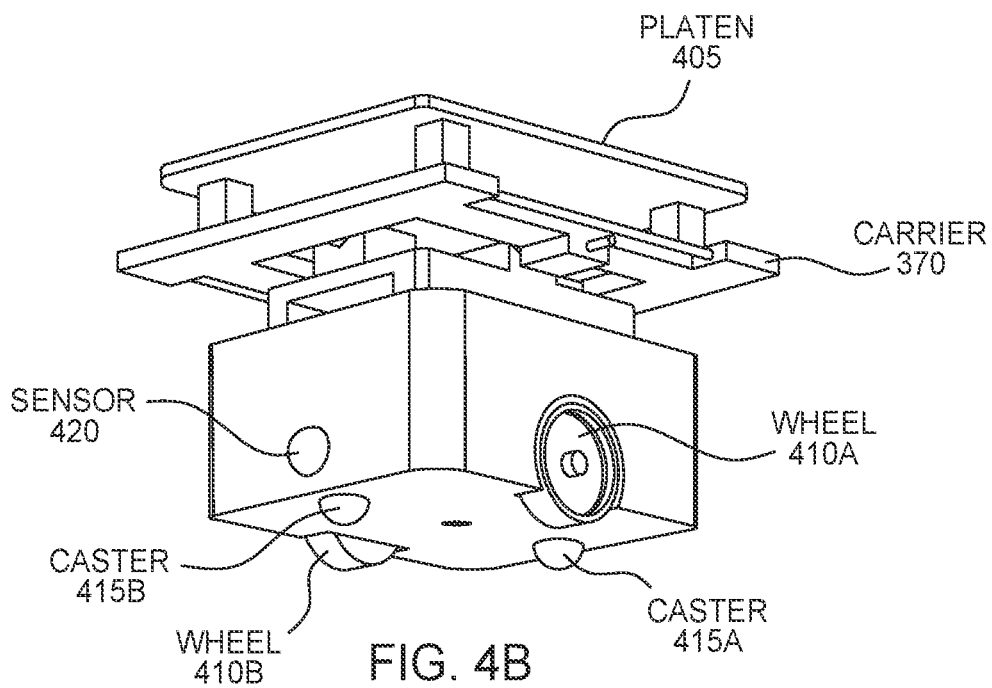

FIGS. 4A and 4B illustrate several views of the autonomous robot 115, according to embodiments. As shown in FIG. 4A, the carrier 370 is mounted on a top side of the robot 115. In one embodiment, the carrier 370 is detachable from the robot 115, and has alignment features so that the carrier 370 is properly seated on the robot 115. Further, a platen 405 is disposed on a top side of the carrier 370. As used herein, the platen 405 is a flat platform on which the garment 120 is placed to provide support when performing digital printing. Referring to FIG. 1, the garment 120 is placed on the platen 405 at one of the garment retrieval stations 105.

In one embodiment, the garment is laid on top of the platen 405 or dressed thereon. Further, the platen 405 may have RFID and/or QR codes for identifying a type of platen, to perform an inventory check, to aid with computer vision, and other purposes. For example, the RFID or QR codes can identify small, medium, or large platens 405 to be used with different sized garments. In the case of garments dressed onto the platen 405, the platen 405 may be raised partially at an angle from the carrier 370 to allow the garment to be pulled over the platen 405. Air vent hoses or fingers may help open up the garment so it can slip onto the platen 405. The platen 405 can be adjustable for different size garments. The platen 405 may have varying shape/contour to make dressing the garment onto the platen 405 easier. Moreover, when the garment is laid on the platen, a hooping frame and attachment assembly can keep the garment taut, wrinkle free, and ready for printing.

FIG. 4B illustrates an underside of the robot 115. The robot 115 includes wheels 410 that are part of a drive system which can also include a motor and a power source (e.g., a battery) for navigating the robot 115 in an environment. While wheels 410 are shown, the robot 115 can be powered by other means such as a track. Further, the robot 115 includes casters 415 which may be unpowered wheels that help to balance the robot 115. In some embodiments, the number of casters and their location may vary.

The robot 115 also includes a sensor 420 which can be a camera or a proximity sensor. For example, the sensor 420 may be a camera which identifies the grid and fiducials illustrated in FIG. 2. Alternatively, the sensor 420 can be used to detect neighboring robots to prevent collisions. The sensor 420 can be any environmental sensor that helps the robot 115 to move in the environment. For example, when using a different type of navigation system, the sensor 420 may be a magnetic or optical type sensor. While one sensor 420 is shown, the robot 115 may have multiple sensors of the same type or different types.

Figure 5A:
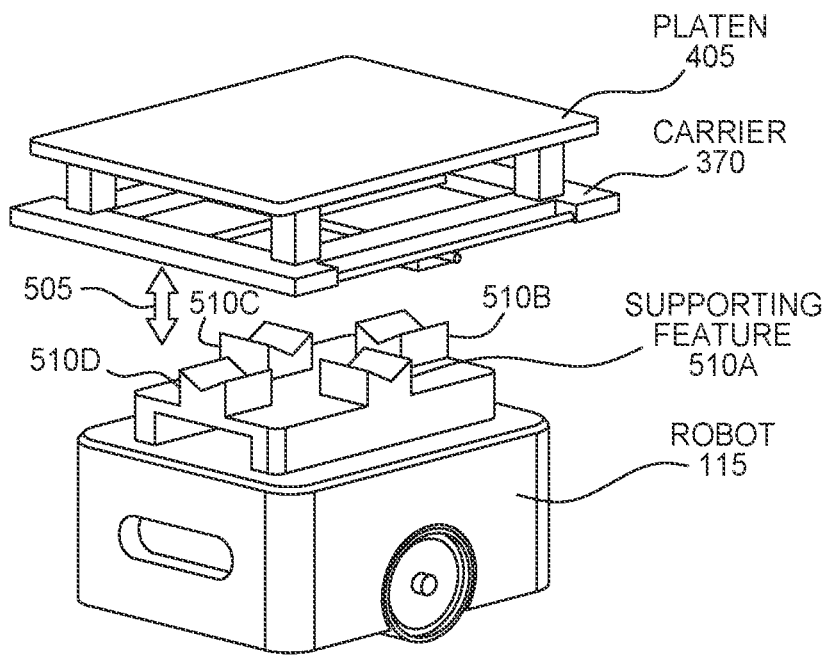
FIGS. 5A and 5B illustrate several views of a detachable carrier aligning to an autonomous robot, according to embodiments.
Figure 5B:
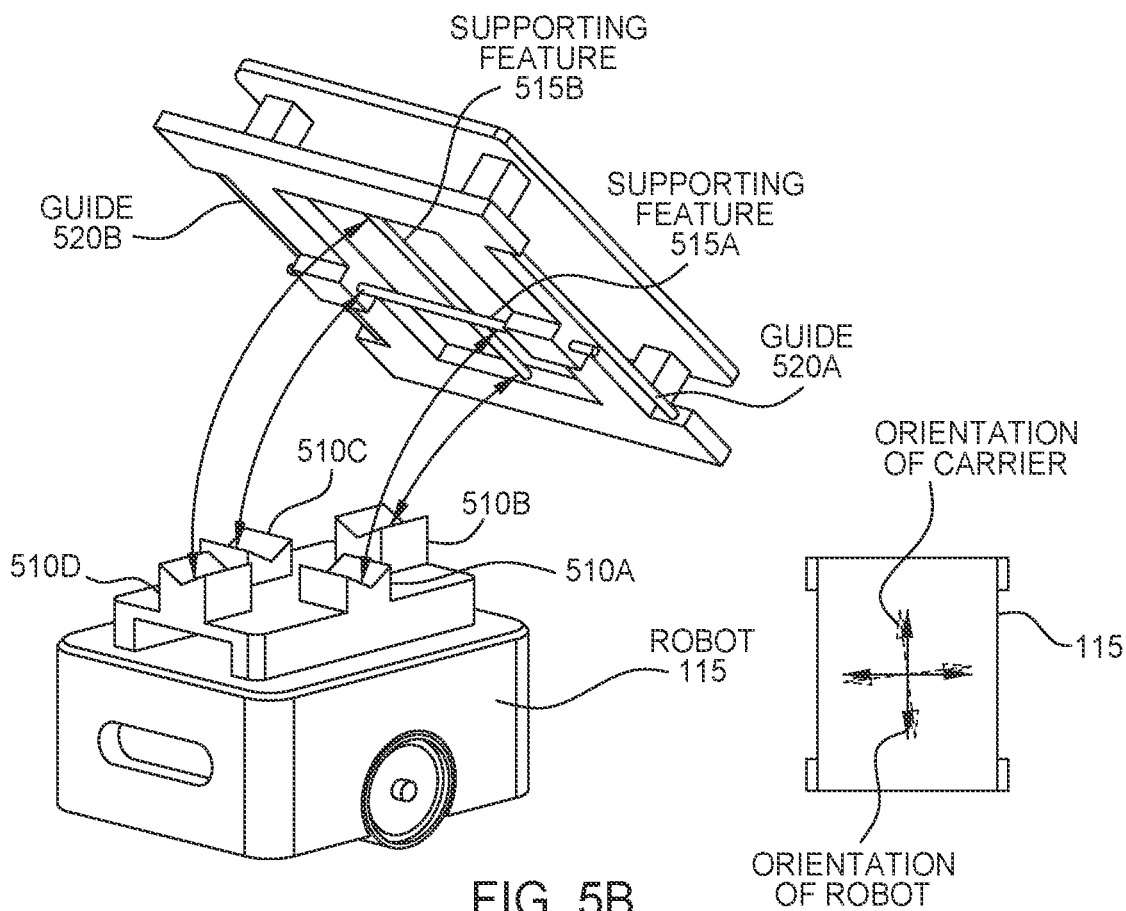

FIGS. 5A and 5B illustrate several views of a detachable carrier 370 aligning to an autonomous robot, according to embodiments. FIG. 5A illustrates a state where the carrier 370 is detached from the robot 115. The top side of the robot 115 includes four supporting features 510A-D which provide V-shaped guides for mating with corresponding supporting features in the carrier 370 (which are shown in FIG. 5B). The supporting features 510A-D are self-aligning so that when the carrier 370 is lowered onto the supporting features 510A-D, the carrier 370 adopts a desired orientation in the x-y plane (which is parallel to the ground). While the supporting features 510 are shown as V-shaped, they may also be U-shaped, or semi-circular shaped.

In one embodiment, the carrier 370 includes at least one expanding element to stretch the garment along a plane that is parallel to a ground surface. For example, one or more springs may be under the platen 405 to push out the platen in the X and Y directions to stretch and flatten the garment disposed on the platen 405. Doing so removes wrinkles in the garment that may have resulted from the garment retrieval process. Once in the stretched state, a hooping frame can be attached to the platen 405 to retain the garment in place. In some embodiments, the platen includes extension sections (may be in the middle) that are pulled into position using springs to accommodate for differing garment sizes. Rather than using springs, the expanding elements can be actuators that push out the platen to stretch and flatten the garments. Also, in one embodiment the platen 405 can be expanded to by adding inserts to the platen (like an insert for expanding a table) to accommodate different sized garments.

FIG. 5B illustrates the underside of the carrier 370 which includes supporting features 515A and 515B which mate with the supporting features 510A-D on the robot 115. The arrows in FIG. 5B illustrates that one side of the supporting feature 515A of the carrier 370 mates with the supporting feature 510A while the other side of the supporting feature 515A mates with the supporting feature 510C. The arrows also illustrate that one side of the supporting feature 515B of the carrier 370 mates with the supporting feature 510B while the other side of the supporting feature 515B mates with the supporting feature 510D.

When lowering the carrier 370 onto the robot 115 as shown by the arrow 505, the orientation of the carrier 370 may be different than the orientation of the robot 115. This difference in orientation is shown in FIG. 5B. However, so long as their orientations are generally the same, when the supporting features 515 on the carrier 370 contact the V-shaped portions of the supporting features 510, the sloped walls will adjust the orientation of the carrier 370 to substantially match the orientation of the robot 115. In this manner, mating the supporting features 510, 515 self-aligns the carrier.

FIG. 5B also illustrates guides 520 along the sides of the carrier 370. These guides 520 can be used to raise the detachable carrier 370 from the robot 115 and lower the carrier 370 onto the robot 115 as shown by arrow 505.

Figure 6A:
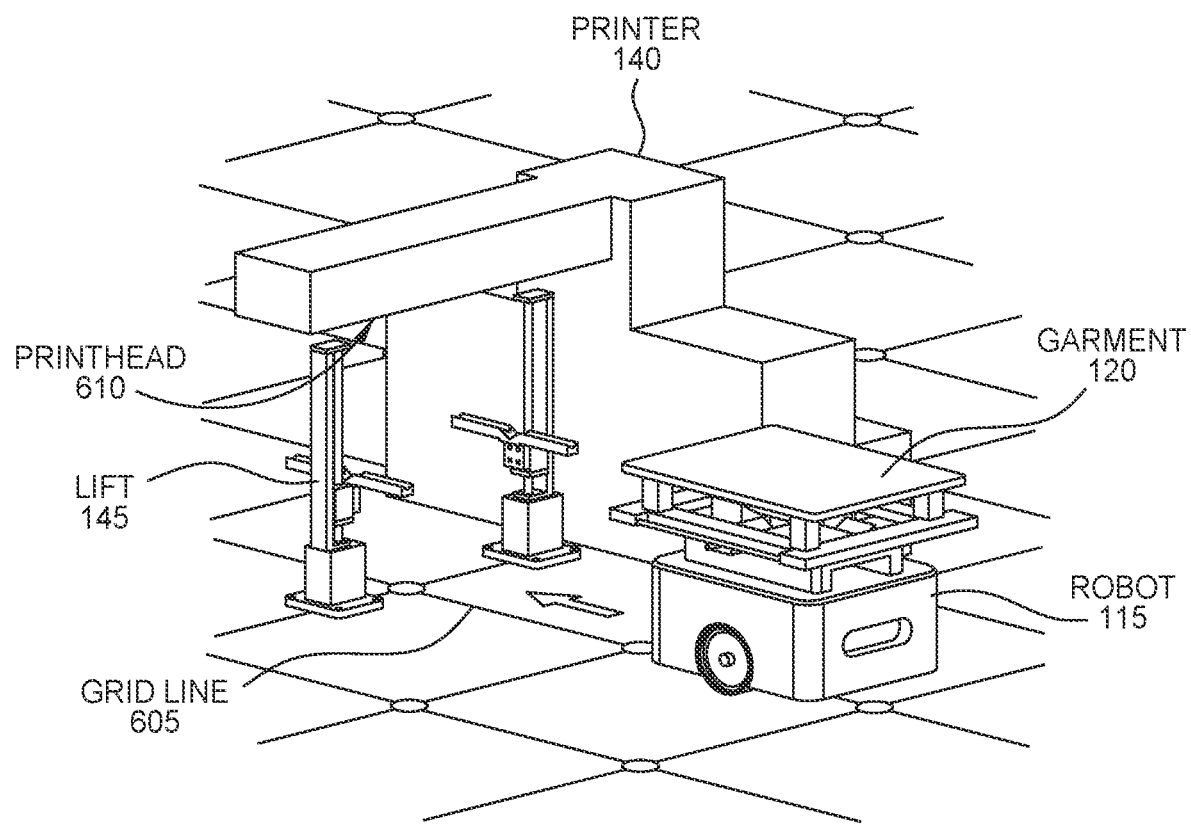
FIGS. 6A-6F illustrate lifting a detachable carrier from an autonomous robot to perform a DTG processing stage, according to embodiments.

FIGS. 6A-6F illustrate lifting a detachable carrier from an autonomous robot to perform a DTG processing stage, according to embodiments. FIG. 6A illustrates the robot 115 moving to a position underneath a portion of the printer 140 that includes a printhead 610. For example, the robot 115 can use a grid line 605 in order to navigate underneath a portion of the printer 140 so that the garment 120 and the printhead 610 are in a facing relationship.

Figure 6B:
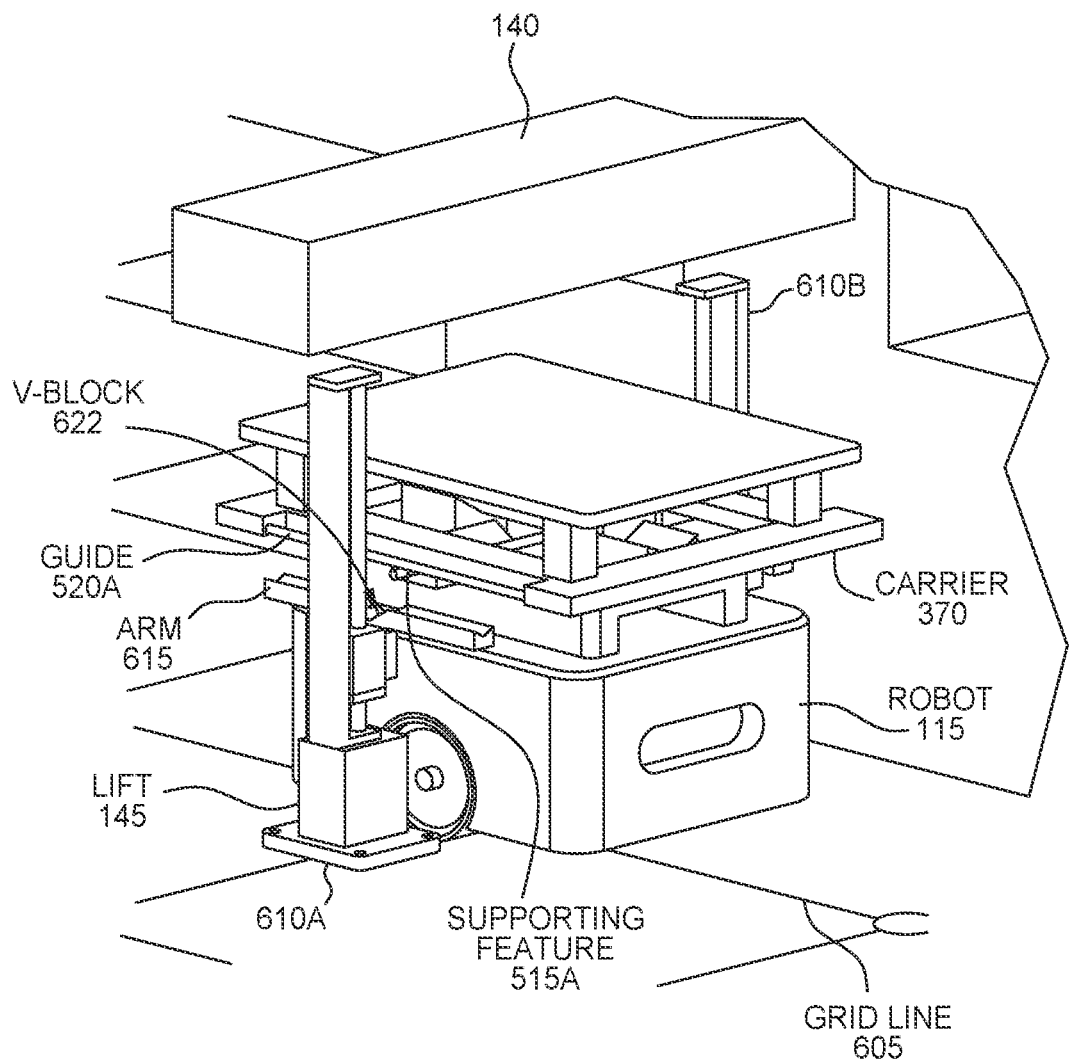

FIG. 6B illustrates when the robot 115 has moved into a desired position underneath the printer 140. In addition to moving the garment 120 to a position underneath a printhead, the robot 115 also is disposed between two portions of the lift 145. That is, the lift 145 includes a first portion 610A disposed on one side of the robot 115 and a second portion 610B disposed on the opposite side of the robot 115. Each portion 610 includes an arm 615 which, when the robot 115 is disposed underneath the printhead, is aligned with the guides 520 on the carrier 370. As discussed below, these arms 615 then mate with the guides 520 to lift the carrier 370 off the robot 115 and reduce the spatial distance between the garment on the carrier 370 and the printhead in the printer 140.

In addition, the lift 145 includes V-blocks 622 (e.g., or other types of alignment surfaces) disposed in the middle of the arms 615. The V-shape defined by the V-blocks 622 extend in a first direction while the V-shape in the arms 615 extends in a second, perpendicular direction. The V-block 622 is used to mate with the supporting feature 515A of the carrier 370 while the V-shape formed by the arm 615 mates with the guide 520A.

In one embodiment, the movement of the robot 115 provides a rough alignment between the garment and the printhead, and between the guides 520/supporting feature 515A and the arms 615N-block 622. This rough alignment is based on the ability of the robot 115 to follow the grid line 605 and stop at the desired location underneath the printhead. However, the accuracy of the movement of the robot 115 may not be sufficient to ensure the printhead and the garment are sufficiently aligned. Thus, using the steps that follow, the lift 145 can provide a more precise alignment between the garment (e.g., the carrier 370) and the printhead.

Figure 6C:
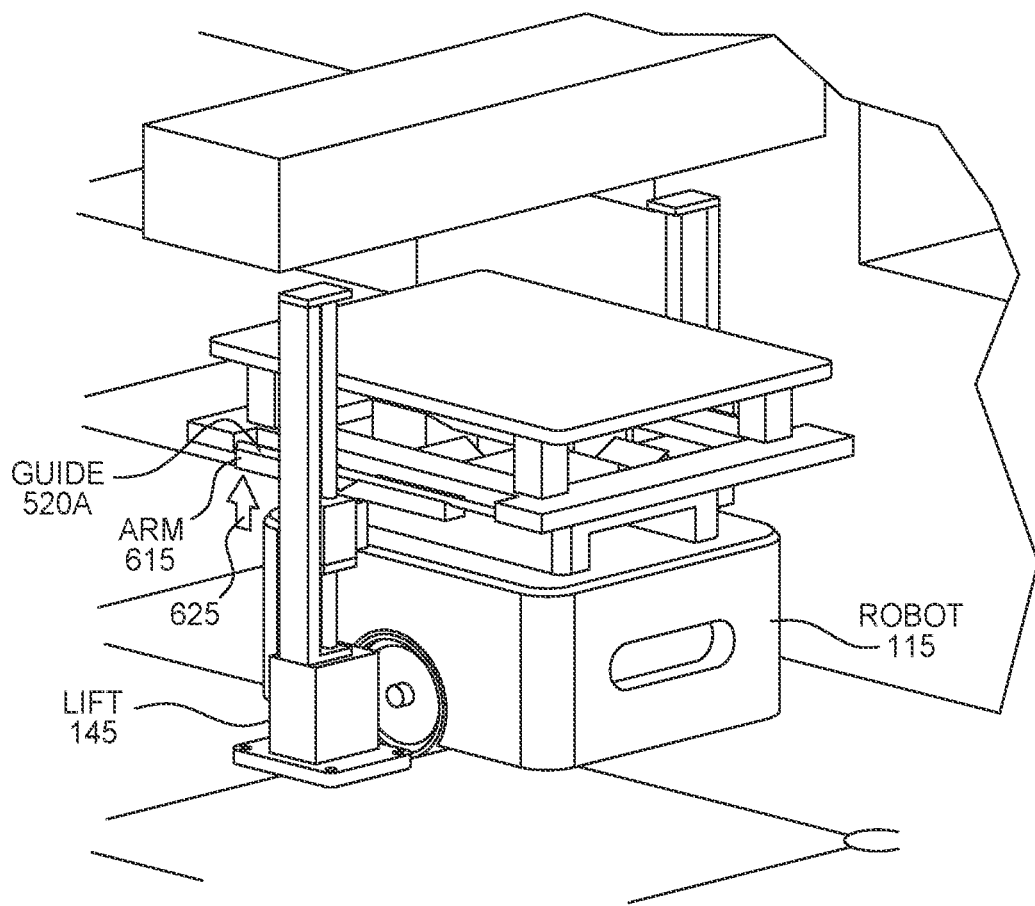

FIG. 6C illustrates the lift 145 raising the arms 615 as shown by the arrow 625 until the V-block 622 mates with the supporting feature 515A and the arms 615 mate with the guides 520 on respective sides of the carrier 370. By using the lift 145, the problem of vertical alignment with the printhead while the carrier 370 is on the robot with an uneven factory floor is avoided (i.e., if the carrier remained attached to the robot). As discussed below, the lift 145 can level the carrier 370 with the printhead as it removes the carrier 370 from the robot.

Figure 6D:
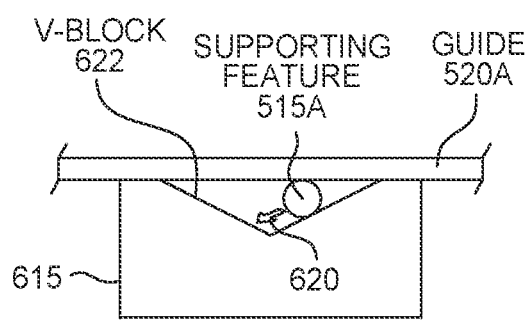
Figure 6E:
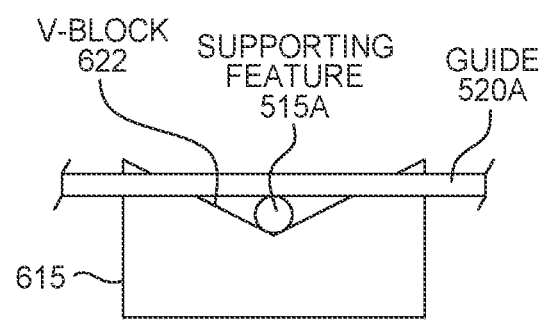

FIGS. 6D and 6E are side views of the V-block 622 and the arm 615. Specifically, FIG. 6D illustrates a point in time when the V-block 622 first contacts the supporting feature 515A. As shown, the supporting feature 515A (or more generally, the carrier 370) is misaligned with the V-block 622 since the supporting feature 515A is not seated in the middle of the V-block 622. As mentioned above, this misalignment may be due to inaccuracies in the movement of the robot 115. However, as the lift 145 continues to raise the arm 620, it performs a self-aligning motion as shown by the arrow 620. Put differently, the V-shape of the V-block 622 urges the supporting feature 515A to move towards the middle of the V, thereby aligning the carrier 370 with the lift 145. In this manner, as the lift 145 raises the carrier 370 off the robot 115, the weight of the carrier 370 enables the supporting feature 515A and the V-blocks 622 to self-align. The result is illustrated in FIG. 6E where the supporting feature 515A is seated in the middle of the V-shape of the V-block 622. In another embodiment, the V-block 622 may be U-shaped or have a different self-aligning shape.

A similar self-aligning or self-centering process can occur in the V-shape formed in the arm 615 that is perpendicular to the V-shape in the V-block 622. In that case, the guide 520A may contact a sidewall of the V formed by the arm 615 which urges the guide 520 into the middle of the V-shape, thereby aligning or centering the carrier 370 with the lift 145. In one embodiment, the V-block 622 and the arm 615 are designed so that the supporting feature 515A contacts the V-block 622 before the guide 520A contacts the arm 615. In this manner, the V-blocks 622 align the carrier 370 in a first direction (e.g., the X-direction) while the arms 615 align the carrier 370 in a second, perpendicular direction (e.g., the Y-direction). The lift 145 and all its corresponding structure can be calibrated to the same plane (e.g., which may be parallel to the ground plane) to eliminate any tilt in the carrier 370 as it is being moved towards the printhead.

The alignment between the arms 615 of the lift 145 and the printhead in the printer 145 can be precisely controlled when these components are installed in the warehouse. Thus, aligning the carrier 370 with the arms 615 inherently aligns the carrier 370 with the printhead. Accordingly, if the carrier 370 has an orientation that is slightly off, or is not precisely level, when disposed on the robot 115, raising the carrier 370 using the lift 145 can correct the orientation of the carrier 370 and level it relative to ground. This ensures the image applied by the printhead has the correct orientation on the garment, and is not distorted because the garment is not level with the print head. Further, although not shown, the lift 145 can include sensors (e.g., position and/or distance sensors) to control the lift to determine when the garment is sufficiently close to the printhead in the Y direction and is properly aligned with the printhead (e.g., correction location in the X plane and level with the printhead). These sensors can be mechanical, optical, and magnetic sensors. Moreover, the sensors could be used to adjust the movement system of the robot (e.g., to detect when one wheel turns faster than the other) or when there is damage to the robot.

Figure 6F:
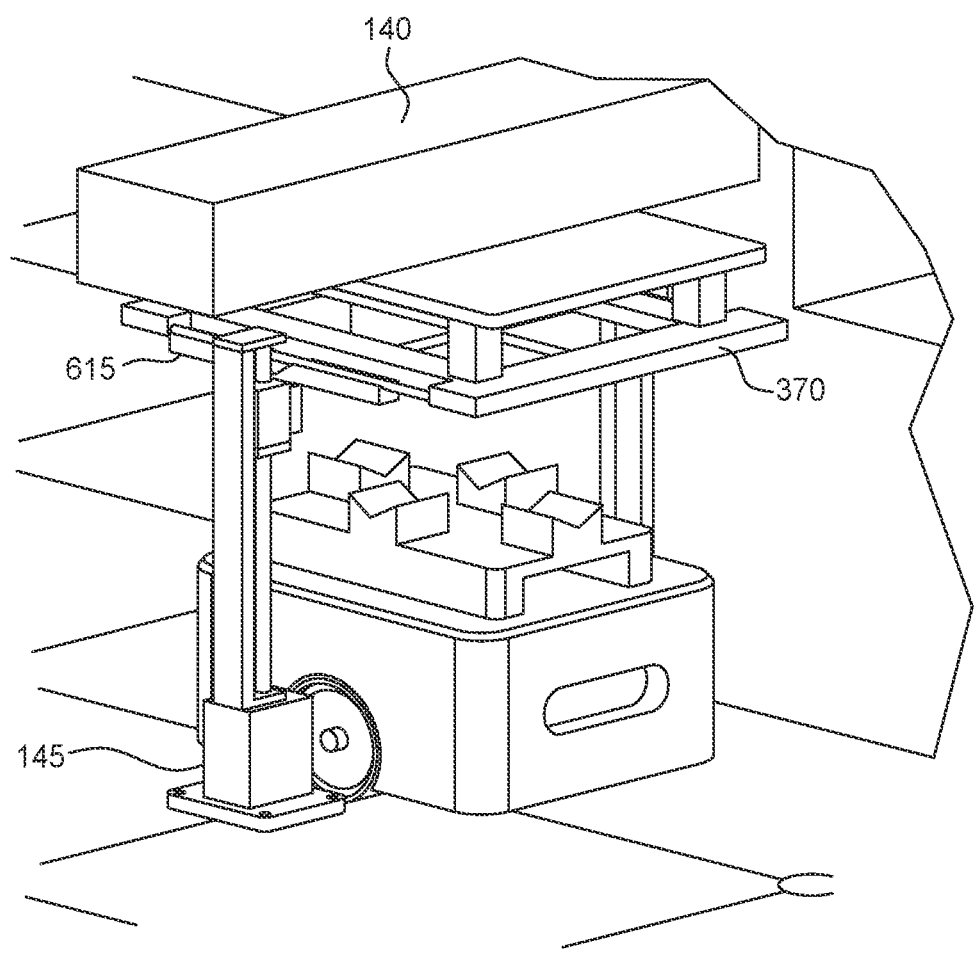

FIG. 6F illustrates when the arms 615 of the lift 145 have raised the carrier 370 so that the garment is in a print-ready state. In some embodiments, the lift 145 can then hold the carrier 370 stationary and stable until the printhead has finished printing the image (or images) onto the garment.

The process can then reverse where the lift 145 lowers the carrier 370 back onto the robot 115. As discussed in FIGS. 5A and 5B, the supporting features 510A-D on the robot and the supporting features 520A-B on the carrier 370 can be used to realign the carrier 370 with the robot 115. That is, if the orientation of the carrier 370 was changed by the lift 145, the orientation of the carrier 370 can be re-centered with the orientation of the robot 115 by the supporting features 510A-D when the carrier 370 is lowered onto the robot 115. The robot is then free to transport the carrier 370 and the garment to the next station in the digital printing process.

In one embodiment, because of the time required to print an image on the garment, the controller may instruct the robot 115 to move to a different printer 140 to retrieve a different garment and move that garment to the next station. That is, the same robot 115 that brought the garment to the printer 140 might not be the same robot that retrieves the garment once the printing is complete. Any time the detachable carrier is removed from the robot, this permits the controller to use the robot to retrieve and move a different garment rather than having the robot sit idle waiting. Doing so may permit the DTG printing system to have the same throughput as a system that requires the robots to drop off and retrieve the same garment at each station but while using fewer robots.

As mentioned above, the embodiments herein are not limited to using a detachable carrier 370 in order to move the garment and the printhead in a position for printing. Any actuator can be used which reduces the spatial distance between the garment being carried by the robot and the printhead. For example, the robot may drive on top of a lift which lifts the entire robot and the carrier. The lift may tilt and rotate in order to level the garment and ensure the garment has the correct orientation with the printhead. In another example, the lift may be integrated into the robot for raising, lowering, and aligning the carrier with the printer, although this system may have to correct for unevenness with the floor. In yet another example, the portion of the printer 140 containing the printhead may lower in order to decrease the vertical distance between the printhead and the garment on the robot (while the robot remains stationary). The printhead may be able to level itself and change its orientation in order to match the plane and orientation of the garment, e.g., to correct for an uneven floor or improve a rough alignment provided by the robot. In another embodiment, there may be a first actuator for moving a portion of the printer 140 and a second actuator for moving the carrier 370 in order to align the garment with the printhead.

Further, the lift 145 can be used in other stations in the DTG printing system. For example, it may be advantageous to perform a similar lifting process when applying the pretreatment solution to the garment.

Also, because the ink used by the printhead can create a mess and damage the robot, the printer 140 may include four additional vertical sides forming a rectangle around the printhead that has dimensions matching the length and width of the carrier 370. Thus, when the carrier 370 is raised as shown in FIG. 6F, the carrier forms a base which, along with the four vertical sides and the portion of the printer 140 containing the printhead, completely encloses the garment in the printer 140. Enclosing the garment in the printer using the carrier can create a full or partial seal. This seal can be used to vent the enclosure to remove fumes, odors, and volatile chemicals as part of the printing process. The environment can include an exhaust processing system for venting the enclosures and safely processing the noxious or hazardous air or chemicals. Further, forming an enclosure reduces the likelihood that the ink from the printing process can spray onto the robot or the floor of the warehouse. A similar enclosure can be formed when raising the carrier 370 to apply the pretreatment solution on the garment or when drying the garment.

Regardless of whether an enclosure is formed, the printhead can include temperature, moisture, and other sensors to confirm ideal environmental working conditions for spray nozzles in the printhead which prevents clogging. If an enclosure is formed, the processing stage may include a moisture correcting apparatus to maintain ideal conditions in the sealed environment every time the printer, pretreatment, dryer, etc. needs to reestablish the ideal environment after resealing its chamber with the carrier 370.

In one embodiment, the warehouse can have general sensors for monitoring the humidity, amount of particulates, and pollutants in the warehouse. The warehouse could have vacuums and environmental air systems for removing pollutants and noxious gases from the environment.

Figure 7:
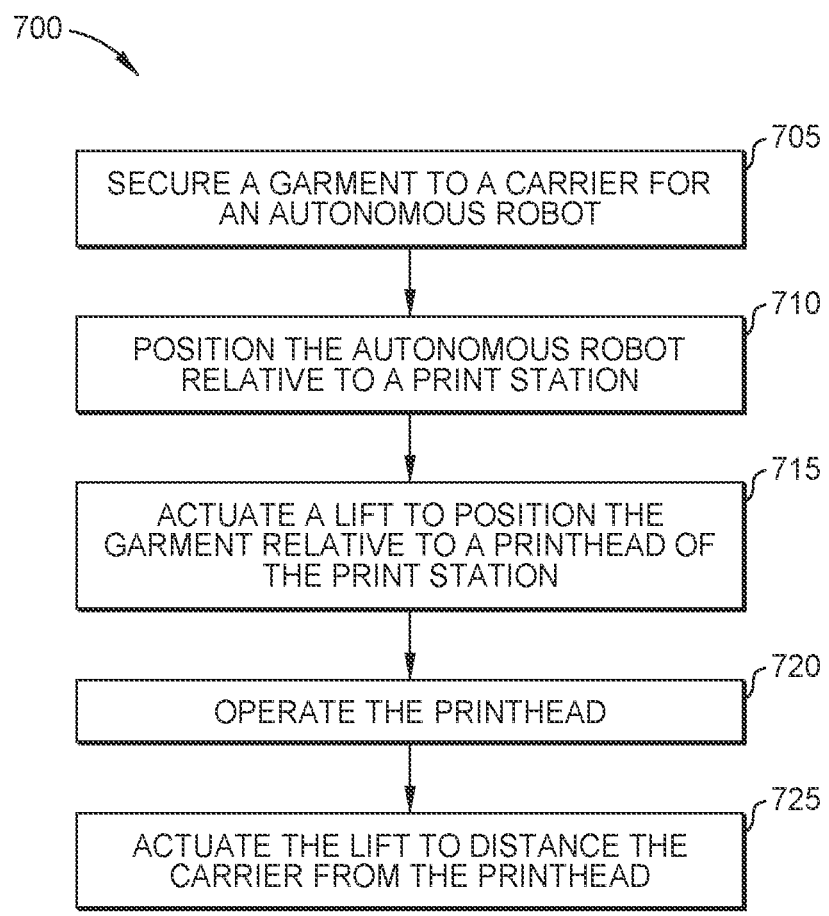
FIG. 7 is a flow chart for aligning a garment to a DTG processing stage, according to one embodiment.

FIG. 7 illustrates a flow chart of a method 700 for aligning a garment to a DTG processing stage, according to one embodiment. For example, the method 700 may be used to print an image on a garment carried by an autonomous robot.

At block 705, a human or a retrieval apparatus secures a garment to a carrier for an autonomous robot. For example, the retrieval apparatus 110 in FIG. 1 may pick up a T-shirt and attach the shirt to a platen on the carrier (e.g., the detachable carrier 370 and the platen 405 shown in FIG. 5A).

At block 710, a controller positions the autonomous robot relative to a DTG processing stage (e.g., a print station). Based on instructions received from the controller, a drive system can control actuation of the autonomous robot, which has the carrier disposed thereon, to position the robot at or near the print station. Any of the various control techniques and algorithms discussed above can be used to move the robot in the environment.

At block 715, the controller actuates a lift to position the garment relative to a printhead of the print station. In one embodiment, the lift removes the carrier from the autonomous robot and positions the carrier into a processing position relative to the printhead, e.g., as shown in FIGS. 6A-6F.

At block 720, the print station operates the printhead to administer one or more chemicals (e.g., ink) onto the garment disposed on the carrier. That is, the printhead prints an image on the garment or article.

At block 725, the controller actuates the lift to distance the carrier from the printhead. For example, the lift may perform the reverse operation shown in FIGS. 6A-6F where instead of raising the carrier towards the printhead, the lift lowers the carrier away from the printhead and onto a waiting robot. Once the lift disengages from the carrier, the robot is free to transport the garment to a different station.

Figure 8A:
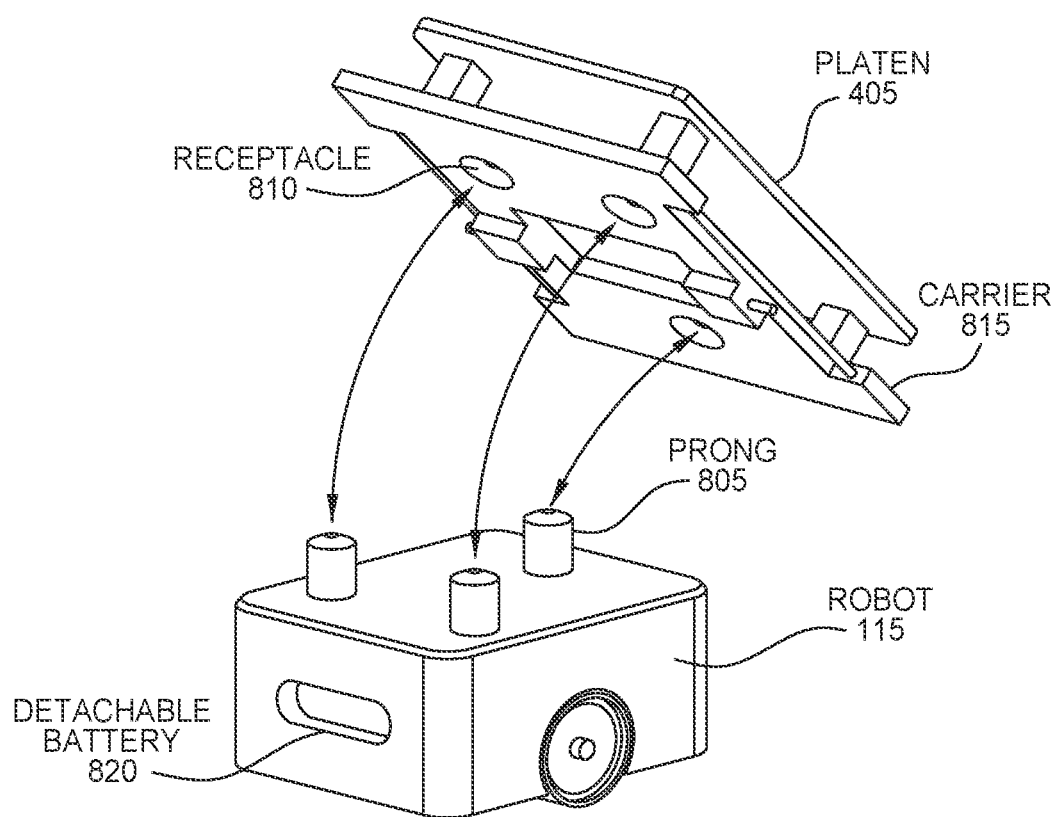
FIGS. 8A-8C illustrate several views of an autonomous robot, according to embodiments.
Figure 8B:
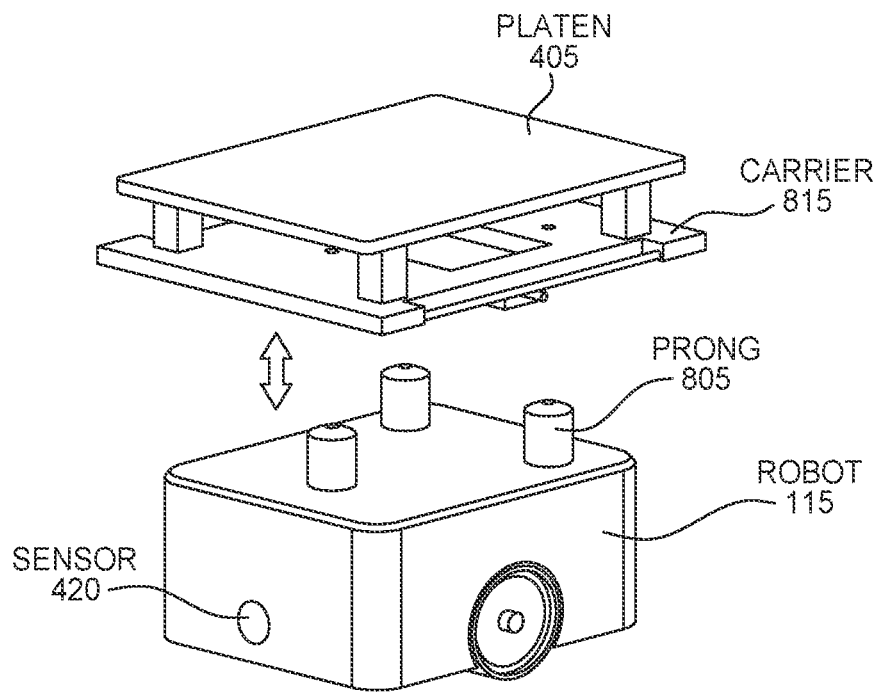
Figure 8C:
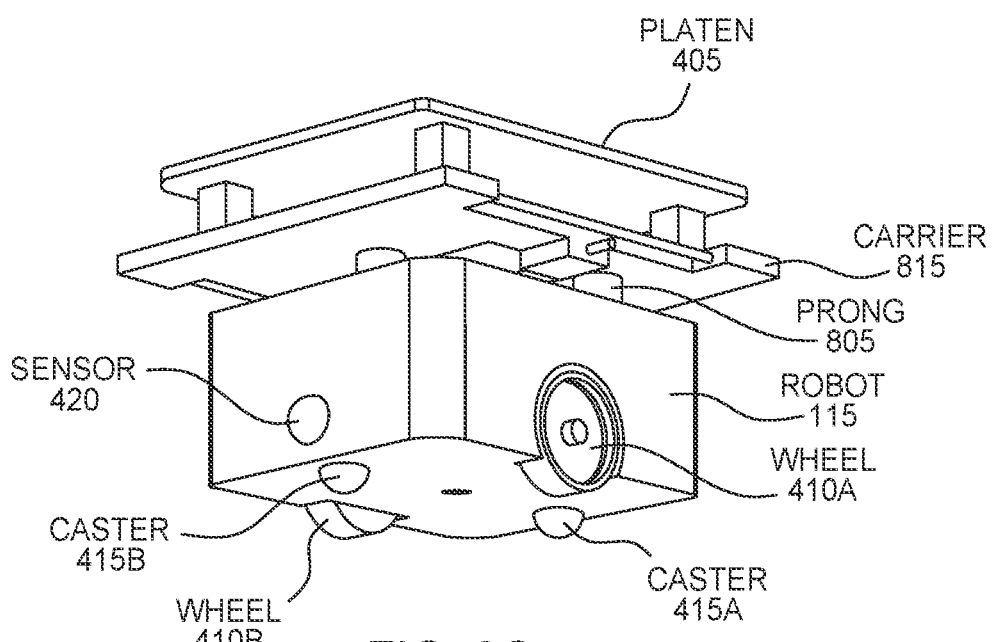

FIGS. 8A-8C illustrate several views of an autonomous robot, according to embodiments. Specifically, FIGS. 8A-8C illustrate the use of different alignment features than FIGS. 4-5 to seat a carrier 815 with the platen 405 on the robot 115. Although not shown, a garment may already be placed on the platen 405 at one of the garment retrieval stations.

FIG. 8A illustrates an underside of the carrier 815 and a top side of the robot 115. The underside of the carrier 815 includes receptacles 810 that define apertures (or female mating members) that mate with prongs 805 on the top side of the robot 115. In another embodiment, the alignment features may be reversed where the receptacles 810 are on the top side of the robot 115 and the prongs 805 protrude from the underside of the carrier 815.

In this embodiment, a top portion of the prong 805 has a frustoconical shape with slanted sides to permit passive alignment with the receptacles 810. Thus, even if the receptacles 810 and the prongs 805 are not precisely aligned when loading the carrier 815 onto the robot, so long as the top surface of the frustoconical shape is within the receptacle, the slanted edge will engage with a side of the receptacle 810 and urge the carrier 815 into precise alignment. Thus the alignment features are self-aligning.

Moreover, the robot 115 includes a detachable battery 820 that can be replaced when in need of recharging. A new battery can then be put into the robot 115 while the old battery recharges. Thus, the robot 115 may have less down time than a robot 115 that must sit at a charging station and wait to recharge its battery. Any of the robots described herein can include a detachable battery. However, in other embodiments, the robots may include internal batteries that rely on the robot periodically parking at a charging station to be recharged.

FIG. 8B illustrates placing the carrier 815 over the top surface of the robot 115 containing the prongs 805. While three prongs 805 are shown, the robot 115 can have any number of prongs (less than three or more than three). As stated above, the frustoconical shape of the prongs 805 can facilitate self-aligning. However shapes could be used such as frusto-pyramidal or a cone shape to facilitate self-aligning. The carrier 815 can be lowered so that the prongs 805 mate with the receptacles (not shown in this view) on the underside of the carrier 815.

FIG. 8C illustrates the result of mating the prongs 805 with the receptacles in the carrier 815. The robot 115 can then move the garment on the platen 405 to the various stages in the printing system. Further, because the carrier 815 is removable like the carrier 370 in FIGS. 4-5, the method 700 in FIG. 7 can be performed where the carrier 815 is removed from the robot 115 during a printing stage, or some other stage in the printing process.

Figure 9A:
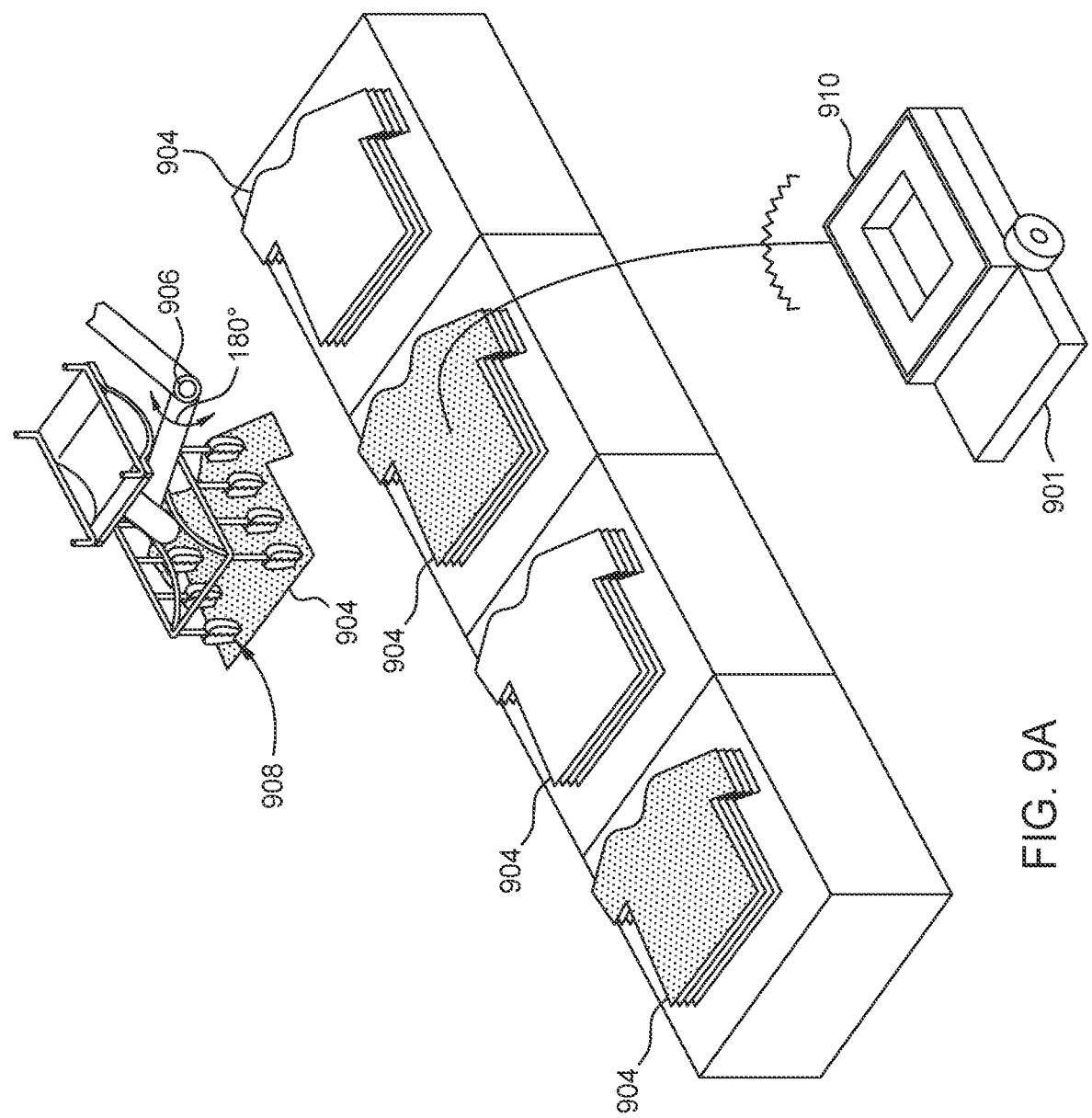
FIGS. 9A-9D illustrate a robotic arm and gripper, according to embodiments.

FIGS. 9A-9D shows a robotic arm 902 that a control system may actuate in order to load a vehicle 901 (e.g., the robot 115) with a garment, for example a T-shirt. For example, the embodiments illustrated in FIGS. 9A-9D may be used as the retrieval apparatus 110 in FIG. 1. As shown in FIG. 9A, a T-shirt 904 corresponding to a customer order may be retrieved from an inventory of different T-shirts of different sizes and/or styles/colors. The robotic arm 902 includes joints 906 allowing a plurality of degrees of freedom, and soft grippers 908 for grasping garments.

Figure 9D:
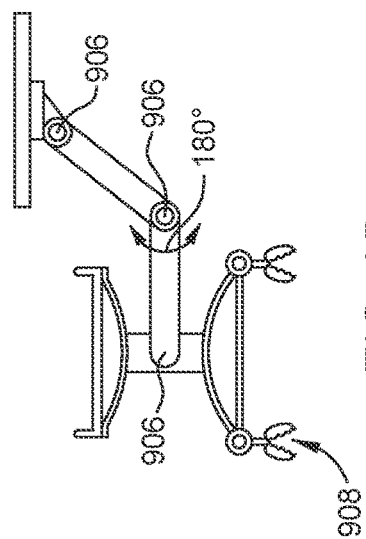
Figure 9C:
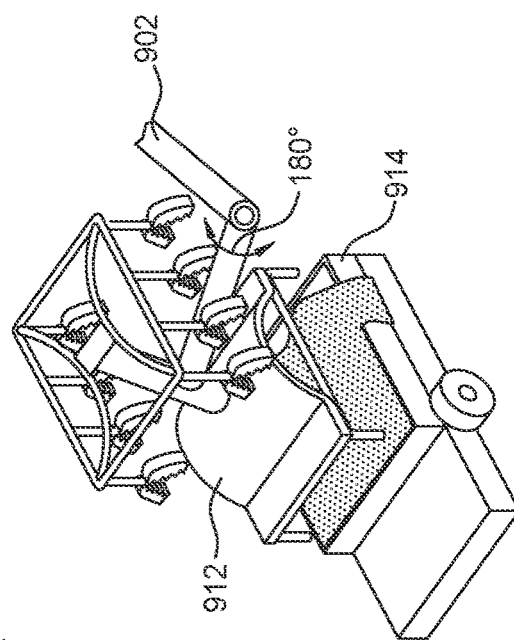
Figure 9B:
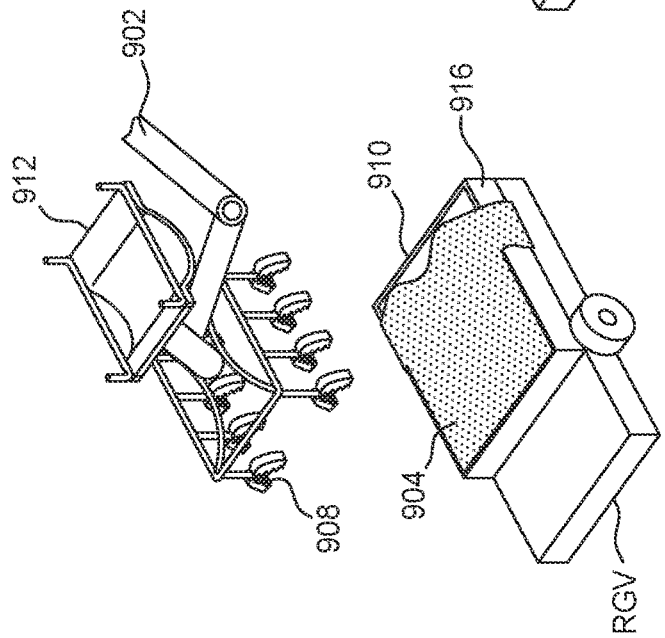

As shown in FIG. 9C, in embodiments, the robotic arm 902 may be used to grab the T-shirt 904 and either place it on a platen 910, or pull it onto the platen 910. In one embodiment, the robotic arm 902 is equipped with grippers 908 that grab each T-shirt 904 individually and place the T-shirt on the platen. In one embodiment, the robotic arm grippers may be soft grippers that include an outer skin made of rubber or similar material. In some embodiments, the gripper fingers or claws may open and close via electromechanical or pneumatic motors. In one embodiment, the gripper fingers may include surface features that enhance the ability for the grippers to grab the T-shirt.

In one embodiment, the robotic arm 902 includes a hoop frame gripper 912 operable to grab an upper hooping plate 914 and place the hooping frame on a lower hoop plate 916 for embroidery operations or a platen for DTG printing operations, as shown in FIG. 9C. The hoop frame gripper 912 may use magnetic force to grab onto or release the hoop upper plate.

As shown in FIG. 9D, the robotic arm 902 can rotate 180 degrees or 360 degrees about its axis. In one embodiment, one end of a two ended robotic arm may include soft grippers operable to grab T-shirts and the other end of the robotic arm may include a gripper operable to grab and place a top hooping plate onto a bottom hooping plate for embroidery processing or directly onto a platen for DTG printing. In some embodiments, the top hopping plate gripper is an electromagnetic gripper.

As discussed above, a pretreatment station of a DTG printing system may apply pretreatment solution to an entire side of a garment to be DTG printed on or may only apply pretreatment solution to a portion to be printed on. For example, if a customer order indicated the printing area to be a 4"×4" area on the left front breast of a T-shirt, the pretreatment solution is only applied to that area, instead of a larger portion of the shirt, for example the entire front portion, or an area spanning the entire width of the shirt.

Figure 10B:
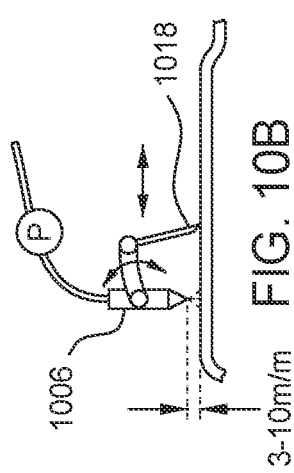
FIGS. 10A-10D illustrate a pretreatment machine, according to embodiments.
Figure 10C:
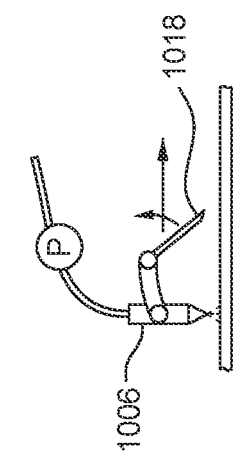
Figure 10D:
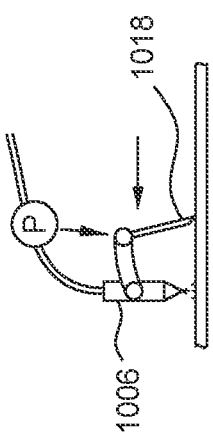
Figure 10A:
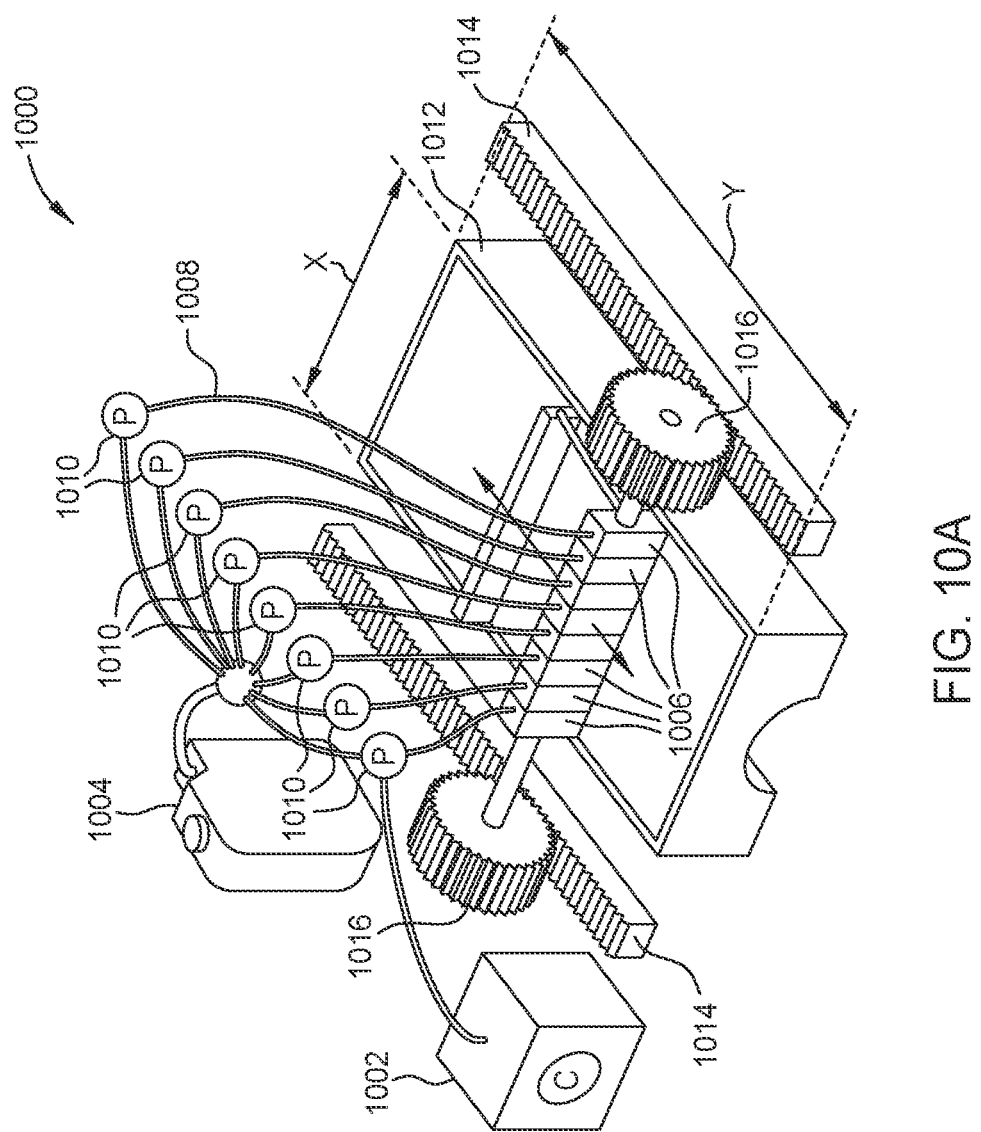

FIGS. 10A-10B show an embodiment of a pretreatment system 1000 which may be used as the pretreatment apparatus 130 in FIG. 1. As shown, the pretreatment system 1000 includes a controller 1002 (which may be part of the primary or secondary controller illustrated in FIG. 1), a pretreatment solution reservoir 1004, and a plurality of dispensing heads 1006. The dispensing heads 1006 are connected to the pretreatment solution reservoir 1004 with lines 1008. The pretreatment system 1000 further includes a plurality of actuators 1010 connected to each line. The actuators 1010 may be pumps and/or valves connected to the controller 1002. In one embodiment, the controller 1002 selectively actuates the actuators 1010 to dispense pretreatment solution from any combination of one or more dispensing heads 1006.

As shown, the dispensing heads 1006 may be arranged in a line, which may be considered the X-direction. The pretreatment system 1000 may include any number of dispensing heads 1006 and corresponding actuators 1010.

The pretreatment system 1000 further includes a platen 1012, which may also be part of a conveying system as discussed above. The platen 1012 may be movable relative to the dispensing heads 1006 in a Y-direction, perpendicular to the X-direction, for example with a track 1014 and cog wheels 1016. With the selective dispensing in the X-direction and relative movement in the Y-direction, the control system may cause pretreatment solution to be selectively applied to any portion of a garment on the platen 1012, while leaving any portion of the garment untreated. For example, in an assembly of eight dispensing heads 1006, the first two may be turned off by the control system, the next three turned on, and the next two turned off. The controller may cause dispensing as the platen is moved in the Y-direction resulting in a rectangular sub-portion of the garment being pretreated. In this manner, any pattern and shape of one or more pretreatment areas may be applied to a garment. This is beneficial in reducing the amount of pretreatment solution used, the amount of time pretreating a garment, and the amount of time drying the garment before and/or after DTG printing.

In one embodiment, the dispensing heads are located less than 20 mm from the garment surface, and may be between 3 mm and 10 mm, as shown in FIGS. 10B-10C in order to precisely control the area in both the X and Y directions that are pretreated. In embodiments, each dispensing head includes one or more slots for dispensing the pretreatment solution in a uniform and consistent manner. In embodiments, the pretreatment solution dispensing heads comprise multiple fine holes to spray the pretreatment solution in a uniform and consistent way over the desired area. In embodiments, each pretreatment solution dispensing head may be fed by one or more tubes or hoses that carry the pretreatment solution to the pretreatment solution dispensing head. In embodiments, the flow in each feeding tube or hose may be controlled independently through a solenoid valve, pneumatic valve, or other means. In embodiments, all pretreatment solution dispensing heads are controlled through a single manifold that controls the flow of pretreatment solution.

In embodiments, after the pretreatment solution is dispensed, a pretreatment solution spreader, scraper, or roller 1018 may be lowered onto or near the T-shirt fabric to spread the pretreatment solution and allow for absorption of the pretreatment solution into the fabric. In embodiments, the pretreatment solution spreader 1018 may be actuated by the control system to be lowered near the fabric only at a certain point in the operation of the pretreatment solution dispensing head, as shown in FIGS. 10B-10D.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flow chart illustrations or block diagrams of methods, apparatuses (systems), and computer program products according to embodiments of the present disclosure. It will be understood that each block of the flow chart illustrations or block diagrams, and combinations of blocks in the flow chart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flow chart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flow chart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flow chart illustrations or block diagrams.

The flow chart illustrations and block diagrams in the Figures illustrate the architecture, functionality, and operation of possible implementations of systems, methods, and computer program products according to various embodiments of the present disclosure. In this regard, each block in the flow chart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flow chart illustrations, and combinations of blocks in the block diagrams or flow chart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A digital printing environment, comprising:
   a plurality of pretreatment stations;
   a plurality of digital printing stations;
   a plurality of autonomous robots configured to transport articles between the plurality of pretreatment stations and the plurality of digital printing stations,
   wherein the articles are mounted on detachable carriers that are supported by the autonomous robots, and
   wherein at least a first pretreatment station of the plurality of pretreatment stations is disposed on a first x-y plane and at least a first digital printing station of the plurality of digital printing stations is disposed on a second x-y plane parallel to the first x-y plane so that the first pretreatment station and the first digital printing station are vertically separated in a z direction; and
   an elevator configured to move the detachable carriers, after being removed from the autonomous robots, between the first pretreatment station and the first digital printing station.

2. The digital printing environment of claim 1, further comprising:
   a second elevator configured to move the autonomous robots between the first pretreatment station and the first digital printing station.

3. The digital printing environment of claim 1, wherein:
   a first subset of the autonomous robots are disposed on the first x-y plane and configured to transport articles between the plurality of pretreatment stations and the elevator; and
   a second subset of the autonomous robots are disposed on the second x-y plane and configured to transport articles between the elevator and the plurality of digital printing stations.

4. The digital printing environment of claim 1, wherein:
   the elevator comprises an actuator configured to change a relative vertical distance between an article and at least one of the first pretreatment station and the first digital printing station;
   the actuator is part of a lift configured to raise the article off of the autonomous robots and in a direction towards the at least one of the first pretreatment station and the first digital printing station; and
   the lift comprises alignment features configured to level the detachable carriers as the detachable carriers are raised off of the autonomous robots.

5. The digital printing environment of claim 1, wherein:
   the autonomous robots comprise:
      a drive system configured to move the autonomous robots between the plurality of pretreatment stations and the plurality of digital printing stations, and
      first supporting features disposed on a top side of the autonomous robots; and
   the detachable carriers comprise second supporting features configured to mate with the first supporting features to mechanically interface the detachable carriers with the autonomous robots.

6. The digital printing environment of claim 1, further comprising:
   a primary controller configured to select which of the plurality of pretreatment stations and the plurality of digital printing stations is used by autonomous robots; and
   a secondary controller configured to control routes used by the autonomous robots to move between the plurality of pretreatment stations and the plurality of digital printing stations selected by the primary controller.

7. The digital printing environment of claim 6, further comprising:
   a floor comprising a grid and fiducials at intersections of the grid, wherein the secondary controller is configured to use the grid and the fiducials to move the autonomous robots between the plurality of pretreatment stations and the plurality of digital printing stations selected by the primary controller.

8. The digital printing environment of claim 1, wherein:
   each detachable carrier of the detachable carriers comprises a rack configured to hold multiple levels of platens;
   each level of the multiple levels of platens is vertically separated in a z direction; and the rack is configured to move the platens between the first pretreatment station and the first digital printing station.

9. The digital printing environment of claim 1, wherein the first x-y plane is on a first floor and the second x-y plane is on a second floor different from the first floor.

10. The digital printing environment of claim 1, wherein the first and second x-y planes are on a same floor.

11. A digital printing environment, comprising:
a plurality of processing stages; and
a plurality of autonomous robots configured to transport articles between the plurality of processing stages,
wherein the articles are mounted on detachable carriers that are supported by the autonomous robots, and
wherein a first processing stage of the plurality of processing stages is disposed on a first x-y plane and a second processing stage of the plurality of processing stages is disposed on a second x-y plane parallel to the first x-y plane so that the first processing stage and the second processing stage are vertically separated in a z direction; and
an elevator configured to move the detachable carriers, after being removed from the autonomous robots, between the first processing stage and the second processing stage.

12. The digital printing environment of claim 11, further comprising:
a second elevator configured to move the autonomous robots between the first processing stage and the second processing stage.

13. The digital printing environment of claim 11, wherein:
the first processing stage comprises at least one of a pretreatment station, printing station, and drying station; and
the second processing stage comprises at least one of a folding station and packaging station.

14. A method for digital printing, comprising:
placing articles on a plurality of autonomous robots in a digital printing environment, wherein the digital printing environment comprises:
a plurality of pretreatment stations;
a plurality of digital printing stations; and
the plurality of autonomous robots,
wherein at least a first pretreatment station of the plurality of pretreatment stations is disposed on a first x-y plane and at least a first digital printing station of the plurality of digital printing stations is disposed on a second x-y plane parallel to the first x-y plane so that the first pretreatment station and the first digital printing station are vertically separated in a z direction;
moving the articles between the plurality of pretreatment stations and the plurality of digital printing stations using the plurality of autonomous robots
moving detachable carriers from the autonomous robots, wherein:
the articles are mounted on the detachable carriers; and
the detachable carriers are supported by the autonomous robots; and
moving the detachable carriers between the first pretreatment station and the first digital printing station using an elevator.

15. The method of claim 14, further comprising moving the autonomous robots between the first pretreatment station and the first digital printing station using a second elevator.

16. The method of claim 14, further comprising:
moving articles between the plurality of pretreatment stations and the elevator using a first subset of the autonomous robots disposed on the first x-y plane; and
moving articles between the elevator and the plurality of digital printing stations using a second subset of the autonomous robots disposed on the second x-y plane.

* * * * *